(12) United States Patent
Roh

(10) Patent No.: US 8,860,609 B2
(45) Date of Patent: *Oct. 14, 2014

(54) LOOSELY-COUPLED INTEGRATION OF GLOBAL NAVIGATION SATELLITE SYSTEM AND INERTIAL NAVIGATION SYSTEM

(75) Inventor: June Chul Roh, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 974 days.

This patent is subject to a terminal disclaimer.

(21) Appl. No.: 12/605,148

(22) Filed: Oct. 23, 2009

(65) Prior Publication Data

US 2010/0103033 A1 Apr. 29, 2010

Related U.S. Application Data

(60) Provisional application No. 61/107,914, filed on Oct. 23, 2008.

(51) Int. Cl.
*G01S 19/49* (2010.01)
*G01C 21/16* (2006.01)
*G01S 19/40* (2010.01)

(52) U.S. Cl.
CPC .................................. *G01S 19/40* (2013.01)
USPC ..................................... 342/357.32; 701/500

(58) Field of Classification Search
USPC ............... 342/357.28, 357.3, 357.31, 357.32; 701/213, 220, 468, 470, 500
See application file for complete search history.

(56) References Cited

U.S. PATENT DOCUMENTS

| 6,415,223 B1 * | 7/2002 | Lin et al. ................... 701/208 |
| 2008/0109141 A1 | 5/2008 | Nichols et al. |
| 2009/0326740 A1 * | 12/2009 | Wang .............................. 701/3 |

OTHER PUBLICATIONS

Zur Bonsen, George et al., "Combining GPS with Sensor-Based Dead Reckoning," GPS World, Apr. 1, 2005, 11 pages. Found at: http://www.gpsworld.com/gps/continuous-navigation-956.
Hofmann-Wellenhaf, Bernhard, et al., Let's Go Downtown! Let's Go Indoor!, GPS World, Nov. 2007, 9 pages. Found at: http://www.gpsworld.com/wireless/indoor-positioning/let039s-go-downtown-let039s-go-indoors-3758.

* cited by examiner

*Primary Examiner* — Dao Phan
(74) *Attorney, Agent, or Firm* — Steven A. Shaw; Frederick J. Telecky, Jr.

(57) ABSTRACT

Techniques for loosely coupling a Global Navigation Satellite System ("GNSS") and an Inertial Navigation System ("INS") integration are disclosed herein. A system includes a GNSS receiver, an INS, and an integration filter coupled to the GNSS receiver and the INS. The GNSS receiver is configured to provide GNSS navigation information comprising GNSS receiver position and/or velocity estimates. The INS is configured to provide INS navigation information based on an inertial sensor output. The integration filter is configured to provide blended position information comprising a blended position estimate and/or a blended velocity estimate by combining the GNSS navigation information and the INS navigation information, and to estimate and compensate at least one of a speed bias and a heading bias of the INS navigation information.

28 Claims, 2 Drawing Sheets

LOOSELY-COUPLED INTEGRATION OF GLOBAL NAVIGATION SATELLITE SYSTEM AND INERTIAL NAVIGATION SYSTEM

CROSS-REFERENCE TO RELATED APPLICATIONS

This application is a non-provisional application claiming priority to provisional application Ser. No. 61/107,914, filed on Oct. 23, 2008, entitled "A Loosely-Coupled GNSS/IMU Integration Filter," the teachings of which are incorporated by reference herein.

BACKGROUND

As Global Navigation Satellite System ("GNSS") receivers become more common, users expect improved performance in increasingly difficult scenarios. GNSS receivers may process signals from one or more satellites from one or more different satellite systems. Currently existing satellite systems include the global positioning system (GPS), and the Russian global navigation satellite system (GLONASS). Systems expected to become operational in the near future include Galileo, quasi-zenith satellite system (QZSS), and Beidou. For many years, inertial navigation systems have been used in high-cost applications such as aircraft to aid GNSS receivers in difficult environments. The recent trend is to try to integrate a GNSS receiver with low-cost inertial sensors to improve performance when many or all satellite signals are severely attenuated or otherwise unavailable. The high-cost and low-cost applications for these inertial sensors are very different because of the quality and kinds of sensors that are available.

SUMMARY

Techniques for loosely-coupled integration of a Global Navigation Satellite System ("GNSS") and an Inertial Navigation System ("INS") are disclosed herein. In accordance with some embodiments, a system includes a GNSS receiver, an INS, and an integration filter coupled to the GNSS receiver and the INS. The GNSS receiver is configured to provide GNSS navigation information including GNSS receiver position and velocity estimates. The INS is configured to provide INS navigation information based on one or more inertial sensor outputs. The integration filter is configured to provide blended position and/or velocity estimates by combining the GNSS navigation information and the INS navigation information, and to estimate and compensate at least one of a speed bias and a heading bias of the INS navigation information.

In accordance with at least some other embodiments, a method includes computing, by a GNSS receiver, GNSS navigation information comprising position and velocity estimates of the GNSS receiver. An INS computes INS navigation information based on inertial sensor outputs. An integration filter combines the GNSS navigation information and the INS navigation information to generate blended position and/or velocity estimates. The integration filter also estimates and compensating at least one of a speed bias and a heading bias of the INS navigation information.

In accordance with yet other embodiments, an integration filter includes means for combining GNSS navigation information provided by a GNSS receiver with INS navigation information provided by an INS to provide blended position and/or velocity estimates. The integration filter also includes means for estimating and compensating at least one of a speed bias and a heading bias of the INS navigation information. The GNSS navigation information comprises GNSS receiver position and velocity estimates.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
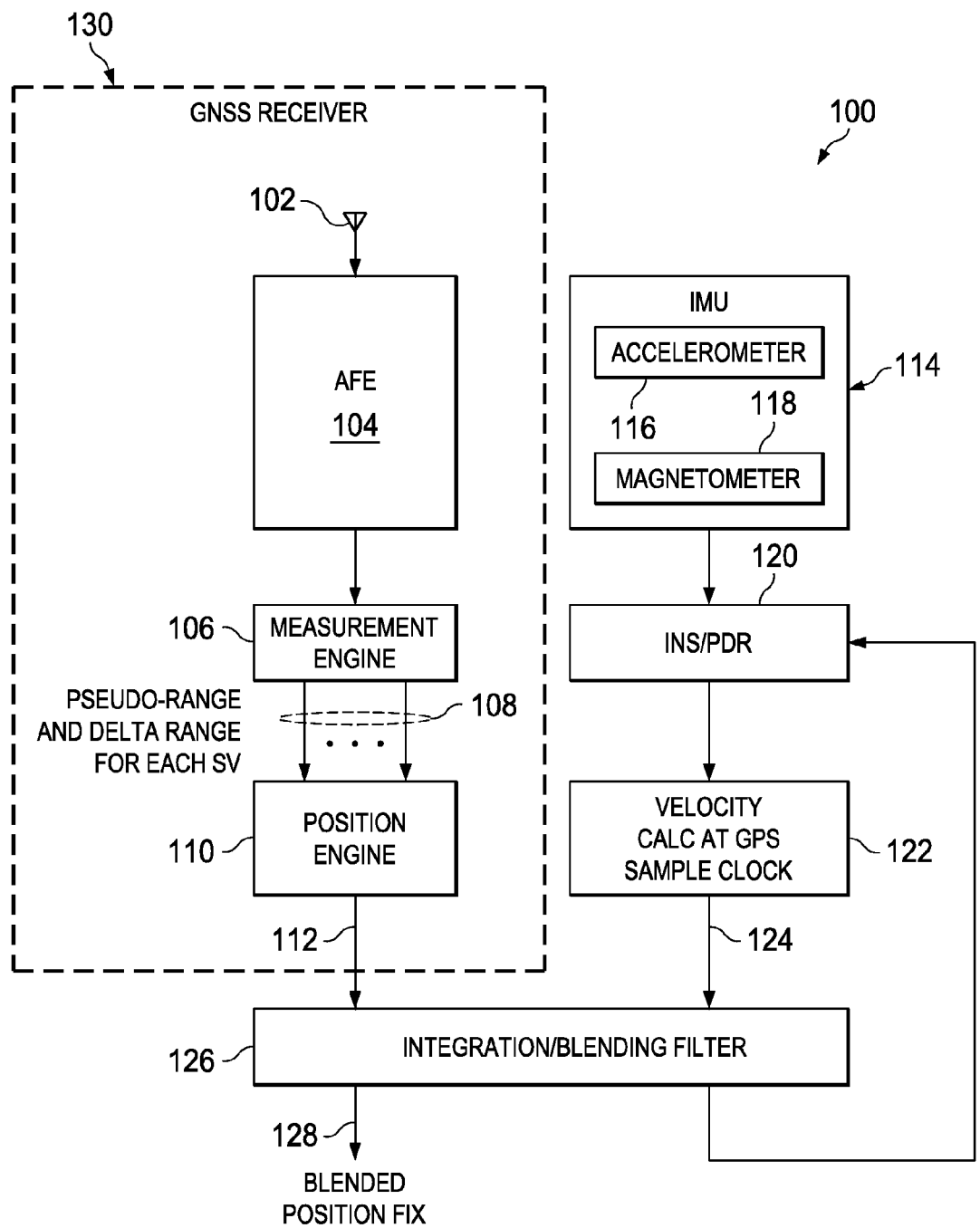
FIG. 1 shows a block diagram of a system integrating a Global Navigation Satellite System ("GNSS") receiver and an Inertial Navigation System ("INS") in a loosely-coupled manner in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Application of low-cost inertial sensors to Global Navigation Satellite System ("GNSS") enhancement is problematic because of the quality and types of available sensors. Low-cost sensors may be unable to provide full navigation data, or may only work in some scenarios. For example, an inertial sensor may be accurate while it is in a car, but inaccurate when carried by a pedestrian. Some integration techniques for GNSS receivers and inertial sensors assume that the sensors constitute a complete stand-alone navigation system or that its expensive components allow it to give precise measurements. Low-cost sensors cannot always allow for these assumptions. In addition, the inertial navigation system ("INS") may be assumed to be fully calibrated, which is not always possible.

For pedestrian navigation, a pedestrian dead reckoning ("PDR") technique may be implemented because it suffices to use relatively low-accuracy inertial sensors. The PDR is usually based on step detection, step length estimation, and heading determination. PDR encounters the following types of dead reckoning ("DR") errors.

Speed bias/error: Any inaccuracy in step length estimation results in speed error/bias in the DR measurement (DR measurements refer to INS outputs, such as position or velocity values).

Heading bias/error: Heading error due to soft-iron effect (local magnetic disturbance) is generally difficult to estimate and compensate since it is usually location-dependent. However, relatively large heading bias due to different attitude of inertial sensors (from assumed attitude) can be estimated and compensated. For example, mounting the inertial sensors on the right side of a user's waist will have 90 degrees of heading bias compared with mounting the inertial sensors on the back of a user's waist.

Similarly, in vehicular applications, speed and heading biases are commonly observed in the INS measurement, and are prominent sources of the error in the final user position and velocity estimate.

Embodiments of the present disclosure provide an integration/blending filter based on an Extended Kalman Filter ("EKF"), which integrates the INS navigation data with GNSS navigation information. Embodiments allow for use of low-cost inertial sensors by providing estimation and compensation of navigation error in INS navigation information. Embodiments also allow generation of blended position and/or velocity estimates based on based on potentially location dependent and time-varying reliability metrics for the GNSS navigation measurement and the INS navigation measurement thereby providing a mechanism for adapting to changing GNSS signal conditions.

FIG. 1 shows a block diagram of a system integrating a GNSS receiver and an INS in a loosely-coupled manner in accordance with various embodiments. The GNSS receiver 130 includes one or more antennas 102, an analog front end ("AFE") 104, a measurement engine 106, and a positioning engine 110.

The antenna(s) 102 converts satellite navigation signals from an incoming airwave form to a conducted form. The satellite navigation signals are provided to the analog front end ("AFE") 104 for analog-to-digital conversion. In addition to an analog-to-digital converter, the AFE 104 may include amplifiers, filters, and various other components.

The digitized satellite navigation signals are provided to the GNSS measurement engine 106. The GNSS measurement engine generates measurement signals 108. The measurement signals 108 comprise a pseudorange measurement and delta range measurement for each satellite. The measurement engine can also provide measurement noise variances for the pseudorange measurements and delta range measurements.

The measurement signals 108 are provided to the position engine 110. The position engine 110 estimates GNSS receiver 130 position, GNSS receiver 130 velocity, and time using all the available measurements (the pseudorange and the delta range measurement for each satellite). The GNSS receiver 130 provides the integration/blending filter 126 with GNSS navigation information 112. The navigation information 112 includes GNSS receiver position, velocity, position uncertainty (in term of variance), and velocity uncertainty (in term of variance).

Figure 2:
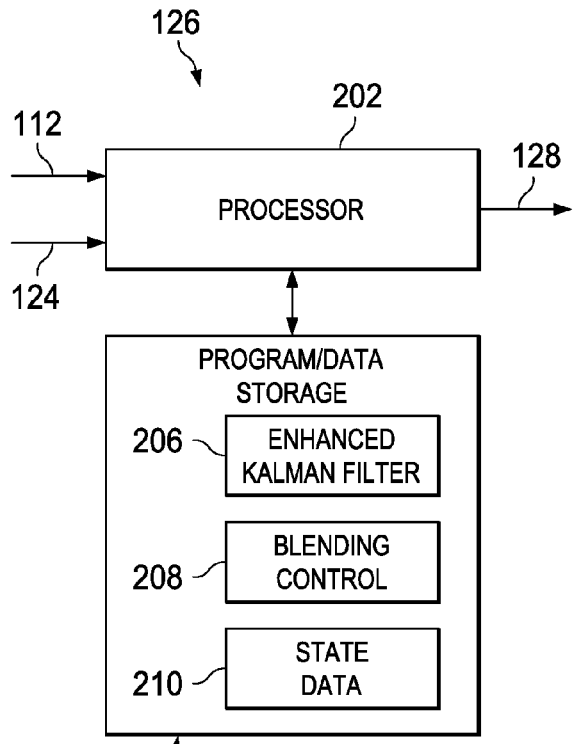
FIG. 2 shows a block diagram of an integration filter for blending GNSS and INS navigation information in accordance with various embodiments.

The INS or PDR module 120 provides inertial navigation information (position and/or velocity) based on the inertial sensor outputs. The output of INS 120 may also be referred to as a DR measurement. An inertial measurement unit ("IMU") 114 includes various inertial sensors. In FIG. 2, the IMU 114 includes one or more accelerometers 116 and at least one magnetometer 118. Other embodiments of the IMU 114 may include more and/or different sensors. For example, other embodiments may include a gyroscope.

In some embodiments, a synchronization module 122 coupled to the INS 120, synchronizes INS velocity data to the GNSS measurement samples. For example, to convert PDR data to the velocity sampled at the GNSS sample instances, PDR position data may be converted to velocity measured at the time instances where GNSS position/velocity estimates are available. The synchronized INS navigation information 124 is provided to the integration/blending filter 126.

The integration/blending filter 126 combines the GNSS navigation information 112 and the INS navigation information 124 to provide optimal blended position/velocity estimates 128 in a variety of GNSS performance conditions. The filter 126 integrates the GNSS and the INS in a loosely-coupled manner and includes calibration features to track speed and heading biases in the INS measurement.

Some embodiments of the integration filter 126 are based on an extended Kalman filter ("EKF"). Other embodiments may include different (e.g., non-EKF) integration filters. Although some of the EKFs presented herein have 6 states, where state is defined in a local navigation frame (NED: north, east and down), all the GNSS/INS integration techniques disclosed herein can be also applied to any other EKF structures if the state includes the user velocity, and to EKFs in which the state is defined in a coordinate system other than NED. For example, the position state elements could be in ECEF (earth-centered earth-fixed), or in latitude, longitude, and altitude.

The state of the GNSS/IMU integration EKF is defined in equation (1) below. Note that the EKF state includes two states, $b_s$ and $b_\psi$, for DR biases estimation.

$$x = [n, e, \dot{n}, \dot{e}, b_s, b_\psi]^T \tag{1}$$

where [n, e] and [$\dot{n}$, $\dot{e}$] are the 2-dimentional user/system position and velocity, respectively, in NE (north and east) coordinate system; $b_s$ and $b_\psi$, are the state variables for speed bias and the heading bias, respectively, both for the DR measurement. The two biases are defined as follows:

$$b_s = s_D - s, \tag{2}$$

$$b_\psi = \psi_D - \psi \tag{3}$$

where $s_D$ and $\psi_D$ are the speed and the heading from the DR measurement, respectively; and s and $\psi$ are the true speed and the true heading, respectively.

A system equation for the integration filter 126 is defined as:

$$x_k = Ax_{k-1} + w_k, \tag{4}$$

$$A = \begin{bmatrix} 1 & 0 & 0 & 0 & T & 0 & 0 & 0 & 0 \\ 0 & 1 & 0 & 0 & 0 & T & 0 & 0 & 0 \\ 0 & 0 & 1 & 0 & 0 & 0 & T & 0 & 0 \\ 0 & 0 & 0 & 1 & 0 & 0 & 0 & T & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & 0 & 0 \\ 0 & 0 & 0 & 0 & 0 & 0 & 0 & e^{-\beta_{bs} T} & 0 \\ 0 & 0 & 0 & 0 & 0 & 0 & 0 & 0 & e^{-\beta_{b\psi} T} \end{bmatrix}$$

where T is the sample time (i.e., time difference between two successive state vectors $x_{k-1}$ and $x_k$); and $w_k$ models the process noise. Here, it is assumed that the speed bias and the heading bias are statistically-independent Gauss-Markov processes defined with parameters $\beta_{bs}$ and $\beta_{b\psi}$, respectively. Some embodiments apply random processes other than Gauss-Markov to the integration filters.

A measurement equation for the blending filter is constructed by integrating the following three types of measurements: i) position measurements from GNSS receiver 130, ii) velocity measurements from GNSS receiver 130, and iii) velocity-related measurements from the sensor-based INS/PDR 120 (DR measurement). The measurement equations for the two GNSS-related measurements may be the same for all embodiments. In order to integrate the DR measurements, for each option/embodiment disclosed, different measurement equation (s) are added to the GNSS-related measurement equations.

The measurement equation for the GNSS position is given as follows:

$$\begin{bmatrix} n_G \\ e_G \end{bmatrix} = \begin{bmatrix} n \\ e \end{bmatrix} + \begin{bmatrix} v_{n_G} \\ v_{e_G} \end{bmatrix} \quad (5)$$

where $[n_G, e_G]^T$ represents the 2D position measurement provided by the GNSS (in NE), $[n,e]^T$ is 2D velocity which is a part of the state variables defined in equation (1), and $[v_{x_G}, v_{y_G}]^T$ models the measurement noise.

The measurement equation for the GNSS velocity is given by:

$$\begin{bmatrix} \dot{n}_G \\ \dot{e}_G \end{bmatrix} = \begin{bmatrix} \dot{n} \\ \dot{e} \end{bmatrix} + \begin{bmatrix} v_{\dot{n}_G} \\ v_{\dot{e}_G} \end{bmatrix} \quad (6)$$

where $[\dot{n}_G, \dot{e}_G]^T$ represents the 2D velocity measurement provided by the GNSS in NE, $[\dot{n},\dot{e}]^T$ is 2D position which is a part of the state variables defined in equation (1), and $[v_{\dot{n}_G}, v_{\dot{e}_G}]^T$ models the measurement noise.

In embodiments where the GNSS receiver 130 outputs the position and velocity estimate in a frame other than NED, the GNSS measurements may be converted to the local navigation frame (NED) in an appropriate way.

Embodiments of the integration filter 126 may process the DR measurement in various ways. In an embodiment where the INS 120 provides 2D navigation information in local horizontal plane (in North and East), or only the 2D information is reliable even though 3D navigation is provided by the INS 120, the following DR measurement equations may be applied:

$$\dot{n}_D = \left(1 + \frac{b_s}{\sqrt{\dot{n}^2 + \dot{e}^2}}\right)(\dot{n}\cos b_\psi - \dot{e}\sin b_\psi) + v_{\dot{n}_D}, \quad (7)$$

$$\dot{e}_D = \left(1 + \frac{b_s}{\sqrt{\dot{n}^2 + \dot{e}^2}}\right)(\dot{n}\sin b_\psi + \dot{e}\cos b_\psi) + v_{\dot{e}_D}. \quad (8)$$

Because the measurement equations (7)-(8) include nonlinear equations, the state can be estimated using an extended Kalman filter. Embodiments use a linearized measurement model for the EKF framework. Combining the GNSS position measurement, the GNSS velocity measurement, and the DR measurement, provides the linearized measurement equation of form z=Hx+v where $$z = [n_G, e_G, \dot{n}_G, \dot{e}_G, \dot{n}_D, \dot{e}_D]^T, \quad (9)$$

$$v = [v_{n_G}, v_{e_G}, v_{\dot{n}_G}, v_{\dot{e}_G}, v_{\dot{n}_D}, v_{\dot{e}_D}]^T,$$

$$H = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & H_{5,3} & H_{5,4} & H_{5,5} & H_{5,6} \\ 0 & 0 & H_{6,3} & H_{6,4} & H_{6,5} & H_{6,6} \end{bmatrix}$$

with $$H_{5,3} = -\frac{b_s \dot{n}}{(\dot{n}^2 + \dot{e}^2)^{3/2}}(\dot{n}\cos b_\psi - \dot{e}\sin b_\psi) + \left(1 + \frac{b_s}{\sqrt{\dot{n}^2 + \dot{e}^2}}\right)\cos b_\psi,$$

$$H_{5,4} = -\frac{b_s \dot{e}}{(\dot{n}^2 + \dot{e}^2)^{3/2}}(\dot{n}\cos b_\psi - \dot{e}\cos b_\psi) - \left(1 + \frac{b_s}{\sqrt{\dot{n}^2 + \dot{e}^2}}\right)\sin b_\psi,$$

$$H_{5,5} = \frac{1}{\sqrt{\dot{n}^2 + \dot{e}^2}}(\dot{n}\cos b_\psi - \dot{e}\sin b_\psi),$$

$$H_{5,6} = -\left(1 + \frac{b_s}{\sqrt{\dot{n}^2 + \dot{e}^2}}\right)(\dot{n}\sin b_\psi + \dot{e}\cos b_\psi),$$

$$H_{6,3} = -\frac{b_s \dot{n}}{(\dot{n}^2 + \dot{e}^2)^{3/2}}(\dot{n}\sin b_\psi + \dot{e}\cos b_\psi) + \left(1 + \frac{b_s}{\sqrt{\dot{n}^2 + \dot{e}^2}}\right)\sin b_\psi,$$

$$H_{6,4} = -\frac{b_s \dot{e}}{(\dot{n}^2 + \dot{e}^2)^{3/2}}(\dot{n}\sin b_\psi + \dot{e}\cos b_\psi) + \left(1 + \frac{b_s}{\sqrt{\dot{n}^2 + \dot{e}^2}}\right)\cos b_\psi,$$

$$H_{6,5} = \frac{1}{\sqrt{\dot{n}^2 + \dot{e}^2}}(\dot{n}\sin b_\psi + \dot{e}\cos b_\psi),$$

$$H_{6,6} = \left(1 + \frac{b_s}{\sqrt{\dot{n}^2 + \dot{e}^2}}\right)(\dot{n}\cos b_\psi - \dot{e}\sin b_\psi).$$

Though not explicitly specified, all the variables ($\dot{n}$, $\dot{e}$, $b_s$, $b_\psi$) in equation (9) are a priori estimates, i.e., elements of $\hat{x}_k^- = A\hat{x}_{k-1}^+$ (a part of EKF equations which will be presented in (17)).

In an embodiment where the DR measurement is given in terms of speed and heading, or when it is useful to convert the DR measurement into speed and heading, the following DR measurement equations are applicable:

$$s_D = \sqrt{\dot{n}^2 + \dot{e}^2} + b_s + v_{s_D}, \quad (10)$$

$$\psi_D = \mathrm{atan2}\!\left(\frac{\dot{e}}{\dot{n}}\right) + b_\psi + b_{\psi_D}, \quad (11)$$

where $s_D$ and $\psi_D$ are the speed and the heading measurement from the INS 120, respectively; and $v_{s_D}$ and $v_{\psi_D}$ model the measurement noise.

Because the measurement equations (10)-(11) include nonlinear equations, some embodiments estimate the state using an EKF. For the EKF framework, embodiments use a linearized measurement model, which is given as follows:

$$s_D = \left[0, 0, \frac{\dot{n}}{\sqrt{\dot{n}^2+\dot{e}^2}}, \frac{\dot{e}}{\sqrt{\dot{n}^2+\dot{e}^2}}, 1, 0\right]x + v_{s_D}, \quad (12)$$

$$\psi_D = \left[0, 0, -\frac{\dot{e}}{\dot{n}^2+\dot{e}^2}, \frac{\dot{n}}{\dot{n}^2+\dot{e}^2}, 0, 1\right]x + v_{\psi_D}. \quad (13)$$

Combining the GNSS position measurement, the GNSS velocity measurement, and the DR measurement, provides a final linearized measurement equation of form z=Hx+v with $$z = [n_G, e_G, \dot{n}_G, \dot{e}_G, s_D, \psi_D]^T, \quad (14)$$

$$v = [v_{n_G}, v_{e_G}, v_{\dot{n}_G}, v_{\dot{e}_G}, v_{s_D}, v_{\psi_D}]^T,$$

$$H = \begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & \frac{\dot{n}}{\sqrt{\dot{n}^2+\dot{e}^2}} & \frac{\dot{e}}{\sqrt{\dot{n}^2+\dot{e}^2}} & 1 & 0 \\ 0 & 0 & -\frac{\dot{e}}{\dot{n}^2+\dot{e}^2} & \frac{\dot{n}}{\dot{n}^2+\dot{e}^2} & 0 & 1 \end{bmatrix}.$$

Though not explicitly specified, all the variables ($\dot{n}$, $\dot{e}$, $b_s$, $b_\psi$) in equations (12), (13), and (14) are a priori estimates, i.e., elements of $\hat{x}_k^- = A\hat{x}_{k-1}^+$ (a part of EKF equations which will be presented in equations (17)).

Some embodiments add only the speed measurement given in equation (10). The linearized measurement model is given in equation (12). This option is also applicable to accelerometer-only embodiments of the IMU 114. For this option, the integration filter 126 EKF can have only 5 states:

$$x = [n, e, \dot{n}, \dot{e}, b_s]^T. \quad (15)$$

Some embodiments add only the heading measurement given in equation (11). The linearized measurement model is given in equation (13). For this option, the integration EKF can have only 5 states:

$$x = [n, e, \dot{n}, \dot{e}, b_\psi]^T. \quad (16)$$

Each of the embodiments described above may follow the standard extended Kalman filtering equations as summarized below:

$$\hat{x}_k^- = A\hat{x}_{k-1}^+$$

$$P_k^- = AP_{k-1}^- A^T + Q_k$$

$$K_k = P_k^- H_k^T (H_k P_k^- H_k^T + R_k)^{-1}$$

$$\hat{x}_k^+ = \hat{x}_k^- + K_k[z_k - h_k(\hat{x}_k^-)]$$

$$P_k^+ = (I - K_k H_k) P_k^- \quad (17)$$

where $h_k$ indicates the measurement equation (including the nonlinear DR measurement equations); $Q_k$ is the covariance matrix for the process noise, i.e., $w_k \sim N(0, Q_k)$ (which means Gaussian random vector with zero-mean and covariance $Q_k$); and $R_k$ is the covariance matrix for the measurement noise, i.e., $v_k \sim N(0, R_k)$.

When the GNSS navigation information 112 is unreliable (e.g., in GNSS outage, for example, when the GNSS receiver 130 is indoors), tracking the DR biases is not very meaningful since there is no reference that can be used for estimating the DR biases. In such cases, some embodiments freeze the state variables for the DR biases at GNSS outage, or more generically, when the quality of the GNSS measurement is poor. Some embodiments implement this technique by setting the process noise variances for the DR bias states to small numbers, based on the quality of the GNSS measurement. For example, the process noise variances for the DR bias states may be reduced when GNSS position uncertainty is larger than a predetermined threshold value (e.g., in GNSS outage).

The integration filter 126 allows for flexible blending of GNSS and INS navigation information. Some embodiments employ selective dead reckoning wherein, the DR measurement from the INS 120 is used selectively over time. That is, the DR measurement may be solely used when the GNSS position/velocity estimate accuracy is poor. Embodiments provide various implementations. For example, when GNSS position/velocity estimates are reliable (in good GNSS signal condition), an embodiment can bypass the integration filter and directly use the GNSS output. Alternatively, an embodiment may achieve the same result within the integration filter 126 by setting the measurement noise variances for the DR measurement to large numbers compared with the GNSS measurement noise variances so that the integration filter 126 virtually ignores the DR measurement.

Similarly, when the accuracy of the GNSS position/velocity estimate is poor (in bad GNSS signal conditions), the GNSS measurement may be completely ignored and unused. To function in this way, embodiments can bypass the integration filter and directly use the DR output (assuming the INS 120 outputs the user position as well as the user velocity). Alternatively, an embodiment may achieve the same result within the integration filter 126 by setting the measurement variances for the GNSS position and velocity to large numbers compared with the DR measurement noise variances so that the blending filter virtually ignores the GNSS position/velocity measurement.

Embodiments use a variety of metrics to measure GNSS signal quality. For example, signal quality can be based on the number of satellites whose signal level with respect to noise level is greater than a threshold value (i.e., the number of available satellites).

Some embodiments employ selective INS integration wherein under good GNSS signal conditions the system 100 is configured as a stand-alone GNSS receiver. In this configuration the DR measurements are not used (e.g., as described above). Such a configuration starts to integrate DR measurements only when GNSS signal conditions become poor.

Some embodiments employ continuous GNSS/INS integration wherein the GNSS position and velocity measurements and the DR measurements are always integrated, and the balance between GNSS and INS is automatically controlled by the measurement noise variances for each measurement. The measurement noise variances for GNSS position and velocity are generally time-varying and location-dependent, and should accurately reflect the quality of the GNSS measurement at a given time. For example, noise variance should be high in bad signal conditions (e.g., blockage, multipath) and vice versa. The measurement noise variance for the DR measurement from INS 120 may be determined based on various factors including accuracy of sensors 116, 118, mounting condition of the IMU 114, dynamics of the receiver, etc. The measurement noise variance does not depend on the GNSS signal quality and usually is not location-dependent. The INS 120 measurement noise variance can also be set to be a constant (not changing over time). Using the quality determinations (e.g., noise variance), the integration filter 126 balances between GNSS and INS automatically. For example, it puts more weight on INS navigation information when GNSS signal is poor.

FIG. 2 shows a block diagram of an integration filter 126 for blending GNSS navigation information 112 and INS navigation information 124 in accordance with various embodiments. The integration filter 126 includes a processor 202 and program/data storage 204. The processor 202 may be, for example, a general-purpose processor, a digital signal processor, a microcontroller, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The program/data storage 204 is accessable by the processor 202. The program/data storage 204 is a computer-readable medium and may be, for example, volatile or non-volatile semiconductor memory, optical storage, or magnetic storage. Storage 204 includes programming that when executed causes the processor to perform the various operations disclosed herein. The extended Kalman filter module 206 causes the processor 202 to implement the various Kalman filtering operations described above. Similarly, the blending control module 208 causes the processor 202 to perform the various operations necessary to determine whether and to what extent each of the GNSS navigation information and the INS navigation information effect the blended position information 128. State data 210 includes filter 126 state information (e.g., speed and heading bias values). Other software programming stored in the storage 204 can cause the processor 202 to perform various other operations disclosed herein.

Some embodiments of the integration filter 126 may be implemented with dedicated or programmable hardware, or by a combination of a processor 202 executing software programming and fixed or programmable hardware.

Figure 3:
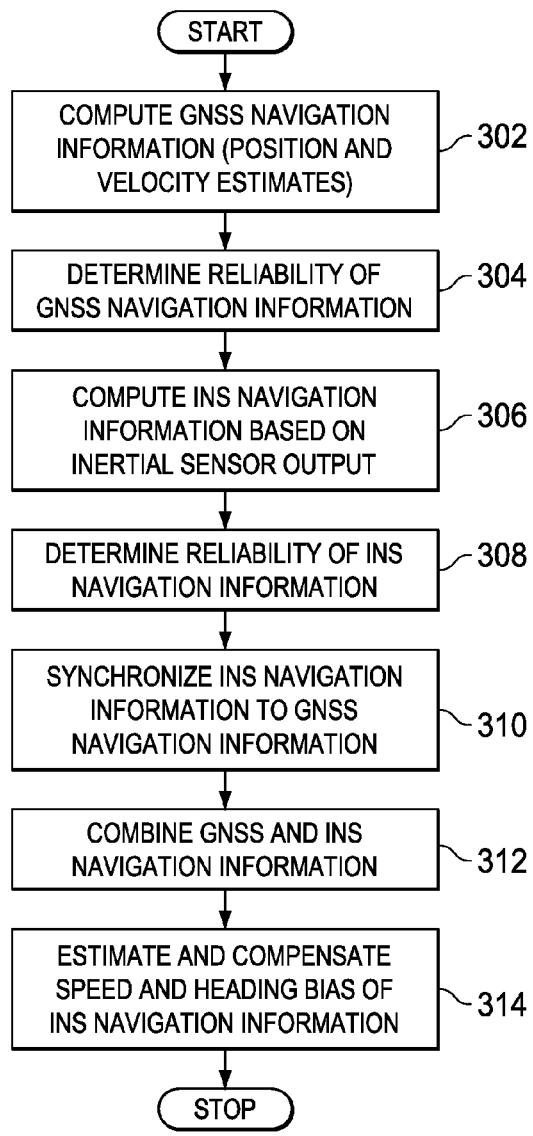
FIG. 3 shows a flow diagram for a method for loosely-coupled integration of a GNSS and an INS in accordance with various embodiments.

FIG. 3 shows a flow diagram for a method of using an integration/blending filter 126 to integrate a GNSS and an INS 120 in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer readable medium and executed by a processor.

In block 302, the GNSS receiver 130 receives satellite navigation signals, and computes GNSS navigation information 112 based on the received signals. The computed navigation information 112 includes a position estimate and/or a velocity estimate.

In block 304, the GNSS receiver 130 determines a reliability measure corresponding to each of the position and velocity estimates. More specifically, the GNSS receiver 130 computes a position uncertainty (variance), and/or a velocity uncertainty (variance) that are provided to the integration filter 126 as part of the navigation information 112. Various quality metrics can be used. Some embodiments determine GNSS information reliability based on the number of available satellites, or the number of satellites whose received signal level with respect to noise is greater than a predetermined threshold value.

In block 306, the INS 120 receives inertial signals from the inertial measurement unit 114 and computes INS navigation information based on the signals. The inertial navigation information includes position and/or velocity. In some embodiments, the INS navigation information may include speed and/or heading.

In block 308, the INS 120 computes a reliability measure (i.e., a measurement noise variance) for each parameter (e.g., speed and heading) included in the INS navigation data of block 306. The INS reliability measure may be based on accuracy of the IMU 114 inertial sensors, mounting condition of the system 100 or the IMU 114, receiver dynamics, etc.

In block 310, the INS navigation information generated by the INS 120 is synchronized to the GNSS navigation information by the synchronization module 122. Synchronizing GNSS and INS navigation information can simplify integration. In some embodiments, the INS 120 comprises a pedestrian dead reckoning system, in which case velocity is based on user step information. When synchronizing PDR based user velocity to the GNSS data, the PDR position is updated at each step event.

$$p_i = p_{i-1} + l_i \begin{bmatrix} \cos\psi_i \\ \sin\psi_i \end{bmatrix}. \tag{18}$$

where $p_i = p(\tau_i)$ is the 2-dimentional position vector consisted of north and east components at time instance $\tau_i$ when an i-th step is detected. $l_i$ is the step length for the step (this can be assumed a constant or can be estimated using the IMU 114 output). $\psi_i$ is the heading (in radians) for the step that is obtained from IMU 114.

To obtain the PDR velocity at a time instance for a GNSS measurement, embodiments first find the PDR position at the current GNSS clock, $p(t_k)$, where $t_k$ is k-th time instance when GNSS measurement is estimated. If the step detection state is not in Static (Static indicates no motion indicative of a step has been detected for a predetermined interval), add a partial step to the last PDR position. The partial step is calculated using the heading and the step interval for the previous step (instead of using unknowns for the unfinished step). If the step detection state is in Static, embodiments maintain the last step position (adding no partial step). Some embodiments subsequently, update the position at the previous GNSS clock, $p(t_{k-1})$, by interpolating with the measured step instances. Finally, take the difference between the two step positions, $p(t_k)$ and $p(t_{k-1})$, to obtain velocity.

$$v(t_k) = \frac{1}{T}[p(t_k) - p(t_{k-1})]. \tag{19}$$

where $T = t_k - t_{k-1}$ is the sample interval for GNSS samples.

In block 310, the integration filter 126, adjusts the blend ratio of GNSS to INS navigation information. The blend ratio may be determined based on the determined GNSS and/or INS navigation data reliability. Embodiments may employ one or more of the balancing techniques disclosed herein, including, for example, selective dead reckoning, selective INS integration, and continuous GNSS/INS integration.

In block 312, the integration filter 126 combines the GNSS and INS navigation data to produce blended navigation information 128. The combining may be performed by an extended Kalman filter. Embodiments may employ one or more of the balancing techniques disclosed herein, including, for example, selective dead reckoning, selective INS integration, and continuous GNSS/INS integration to provide an optimal combination of GNSS and INS navigation information.

In block 314, the integration filter 126 estimates and compensates the speed and heading bias of the INS navigation information.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a global navigation satellite system ("GNSS") receiver configured to provide GNSS navigation information comprising at least one of a GNSS receiver position estimate and a GNSS receiver velocity estimate;
   an inertial navigation system ("INS") configured to provide INS navigation information based on an inertial sensor output; and
   an integration filter loosely coupled to the GNSS receiver and the INS;
   wherein the integration filter is configured to provide blended navigation information comprising at least one of a blended position estimate and a blended velocity estimate by combining the GNSS navigation information and the INS navigation information, and to estimate and compensate at least one of a speed bias and a heading bias of the INS navigation information.

2. The system of claim 1, wherein the loosely-coupled integration filter comprises a filter selected from a group consisting of:
   a Kalman Filter,
   a Linearized Kalman Filter ("LKF"),
   an Extended Kalman Filter ("EKF"),
   an Unscented Kalman Filter ("UKF"),
   a particle filter,
   a least squares filter, and
   an intelligent/learning filter.

3. The system of claim 1, wherein the GNSS navigation information comprises a position uncertainty value and a velocity uncertainty value.

4. The system of claim 1, wherein the INS navigation information comprises one of:
   a first set comprising at least one of a position estimate and a velocity estimate based on inertial sensor output; and
   a second set comprising at a speed estimate and a heading estimate based on inertial sensor output.

5. The system of claim 1, wherein the INS navigation information is synchronized to the GNSS navigation information.

6. The system of claim 1, wherein at least one of a speed bias and a heading bias of the INS navigation information are included in a state variable of the loosely-coupled integration filter, and estimated and compensated in calculating the blended navigation information using the GNSS navigation information and INS navigation information.

7. The system of claim 1, wherein the loosely-coupled integration filter processes INS velocity from the INS using a measurement equation wherein a plurality of INS measurements in a local navigation coordinate are included in the measurement equation in a way that the INS measurements are a function of position and velocity variables and at least one of speed and heading bias variables of an integration filter state with a plurality of measurement noises.

8. The system of claim 7, wherein the INS measurements include at least one of a heading measurement, a speed measurement, a position measurement, and a velocity measurement.

9. The system of claim 7, wherein the INS measurements include a speed measurement and a heading measurement.

10. The system of claim 1, wherein the loosely-coupled integration filter suspends updating of the speed bias and the heading bias based on the GNSS navigation information being unreliable.

11. The system of claim 1, wherein a plurality of process noise variances for said speed bias and/or said heading bias are set to small numbers when the quality of the GNSS measurement is not good, so that state variables for the speed bias and/or the heading bias are effectively not changing over time.

12. The system of claim 1, wherein the loosely-coupled integration filter provides the blended navigation information based solely on the GNSS navigation information when the GNSS signal reception is good, and based solely on INS navigation information when the GNSS signal reception is not good.

13. The system of claim 1, wherein the loosely-coupled integration filter sets an INS measurement noise variance to be large relative to a GNSS measurement noise variance while the GNSS navigation information is reliable, and sets the GNSS measurement noise variance to be large relative to the INS measurement noise variance while the GNSS navigation information is unreliable.

14. The system of claim 1, wherein the loosely-coupled integration filter automatically adjusts the balance of GNSS navigation information and INS navigation information contribution to the blended navigation information based on a measurement noise variance of the GNSS navigation information and a noise measurement variance of the INS navigation information.

15. The system of claim 1, wherein the loosely-coupled integration filter bases the blended navigation information solely on the GNSS navigation information while the GNSS navigation information is reliable, and includes INS navigation information in the blended navigation information only when the GNSS navigation information is unreliable.

16. A method, comprising:
   computing, by a global navigation satellite system ("GNSS") receiver, GNSS navigation information comprising at least one of a position estimate and a velocity estimate of the GNSS receiver;
   computing, by an inertial navigation system ("INS"), INS navigation information based on inertial sensor output;
   combining, by loosely-coupled integration filter, the GNSS navigation information and the INS navigation information to generate blended navigation information comprising at least one of a blended position estimate and a blended velocity estimate; and
   estimating and compensating, by the loosely-coupled integration filter, at least one of a speed bias and a heading bias of the INS navigation information.

17. The method of claim 16, further comprising applying at least one of a Kalman Filter, a Linearized Kalman Filter (LKF), an Extended Kalman Filter (EKF), an Unscented Kalman Filter (UKF), a particle filter, a least squares filter, and an intelligent/learning filter as part of combining the GNSS navigation information and the INS navigation information.

18. The method of claim 16, further comprising computing, as part of the GNSS navigation information, a position uncertainty value and a velocity uncertainty value.

19. The method of claim 16, further comprising synchronizing the INS navigation information to the GNSS navigation information.

20. The method of claim 16, further comprising:
including at least one of a speed bias and a heading bias of the INS navigation information in a state variable of the integration filter; and
estimating and compensating the bias included in the state variable as part of generating the blended navigation information.

21. The method of claim 16, further comprising generating the blended navigation information based solely on the GNSS navigation information when GNSS signal reception is good, and based solely on INS navigation information when the GNSS signal reception is not good.

22. The method of claim 16, further comprising halting updating of the speed bias and the heading bias based on the GNSS navigation information being unreliable.

23. The method of claim 16, further comprising processing INS velocity from the INS using a measurement equation wherein a plurality of INS measurements in a local navigation coordinate are included in the measurement equation in a way that the INS measurements are a function of position and velocity variables and at least one of speed and heading bias variables of an integration filter state with a plurality of measurement noises.

24. A loosely-coupled integration filter, comprising:
means for combining global navigation satellite system ("GNSS") navigation information provided by a GNSS receiver with inertial navigation system ("INS") navigation information provided by an INS to generate blended navigation information comprising at least one of a blended position estimate and a blended velocity estimate; and
means for estimating and compensating at least one of a speed bias and a heading bias of the INS navigation information;
wherein the GNSS navigation information comprises at least one of a GNSS receiver position estimate and a GNSS receiver velocity estimate.

25. The loosely-coupled integration filter of claim 24, wherein the means for combining comprises at least one of:
a Kalman Filter,
a Linearized Kalman Filter (LKF),
an Extended Kalman Filter (EKF),
an Unscented Kalman Filter (UKF),
a particle filter,
a least squares filter, and
an intelligent/learning filter.

26. The loosely-coupled integration filter of claim 24, further comprising means for updating a state variable of the integration filter, the state variable comprising two-dimensional position, two-dimensional velocity, and at least one of speed bias and heading bias of the INS navigation information.

27. The loosely-coupled integration filter of claim 24, further comprising means for controlling contributions of the GNSS navigation information and the INS navigation information to the blended position estimate based on a determined level of reliability of the GNSS navigation information and a determined level of reliability of the INS navigation information.

28. The loosely-coupled integration filter of claim 24, further comprising:
means for processing INS velocity from the INS using a measurement equation wherein a plurality of INS measurements in a local navigation coordinate are included in the measurement equation in a way that the INS measurements are a function of position and velocity variables and at least one of speed and heading bias variables of an integration filter state with a plurality of measurement noises;
wherein the INS measurements include at least one of a heading measurement, a speed measurement, a position measurement, and a velocity measurement.

* * * * *